United States Patent
Mitchell et al.

(10) Patent No.: US 6,574,595 B1
(45) Date of Patent: Jun. 3, 2003

(54) METHOD AND APPARATUS FOR RECOGNITION-BASED BARGE-IN DETECTION IN THE CONTEXT OF SUBWORD-BASED AUTOMATIC SPEECH RECOGNITION

(75) Inventors: Carl Dennis Mitchell, Fremont, CA (US); Anand Rangaswamy Setlur, Naperville, IL (US); Rafid Antoon Sukkar, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 457 days.

(21) Appl. No.: 09/614,018

(22) Filed: Jul. 11, 2000

(51) Int. Cl.⁷ .............................................. G10L 15/12
(52) U.S. Cl. ..................... 704/242; 704/252; 704/255
(58) Field of Search ................................ 704/240, 241, 704/242, 251, 252, 253, 254, 255, 256

(56) References Cited

U.S. PATENT DOCUMENTS

| | | | | |
|---|---|---|---|---|
| 4,914,692 A | * | 4/1990 | Hartwell et al. | 379/406.03 |
| 5,155,760 A | * | 10/1992 | Johnson et al. | 379/88.01 |
| 5,765,130 A | * | 6/1998 | Nguyen | 704/233 |
| 5,956,675 A | * | 9/1999 | Setlur et al. | 704/231 |

* cited by examiner

Primary Examiner—Marsha D. Banks-Harold
Assistant Examiner—Abul K. Azad

(57) ABSTRACT

Robust, multi-faceted sub-word method for rapidly and reliably detecting a barge-in condition of a speaker talking while an automated audio prompt is being played. This sub-word method allows for rapid stopping of the prompt to improve automatic speech recognition and reduce speaker confusion and/or frustration. An automatic speech recognition system (ASR) that practices such a method is also presented.

16 Claims, 3 Drawing Sheets

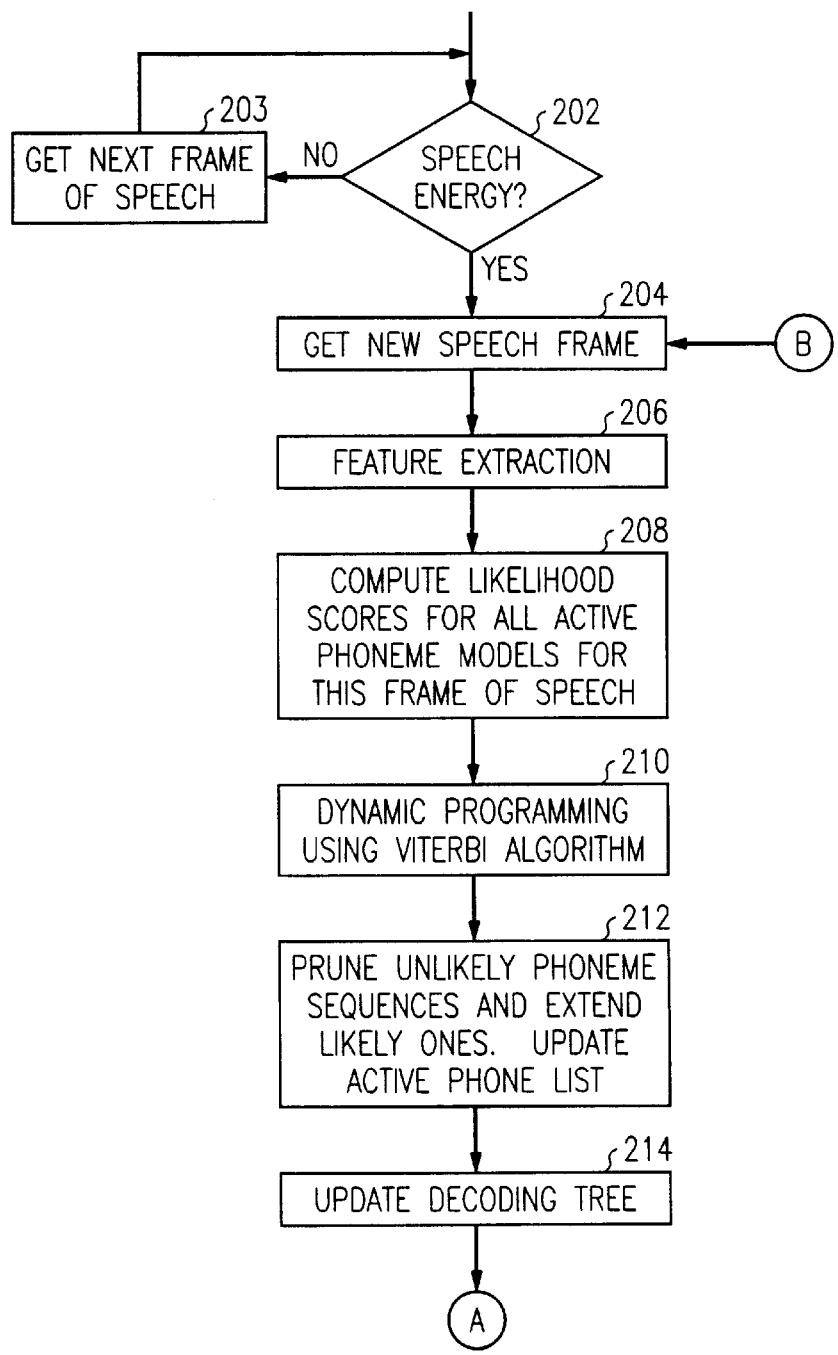

METHOD AND APPARATUS FOR RECOGNITION-BASED BARGE-IN DETECTION IN THE CONTEXT OF SUBWORD-BASED AUTOMATIC SPEECH RECOGNITION

TECHNICAL FIELD

The invention relates to automatic speech recognition (ASR) systems and techniques and more particularly to automatic speech recognition systems and techniques that allow listeners to interactively barge-in and interrupt the interactive messages of such systems.

DESCRIPTION OF THE PRIOR ART

Because of the widespread use of echo cancellation in speech recognition systems (see U.S. Pat. No. 4,914,692), most ASR systems now allow users to interrupt a prompt and provide speech input at an earlier time. Instead of waiting for an ASR recorded or synthesized audio prompt to finish, it is very desirable that the audio prompt be disabled once the ASR system recognizes that the user has begun speaking in response to the current audio prompt, since it is annoying and confusing to the user to have the prompt continue. However, it is also annoying to the user if the audio prompt is disabled in response to an inadvertent cough, breath, clearing of one's throat or other non-vocabulary input.

A known ASR system and method in this area is described in U.S. Pat. No. 5,155,760. This known ASR system and method uses an energy detector as part of a speech detector to determine the onset of speech to disable the prompt. This system and method has the drawback of not being immune to inadvertent out-of-vocabulary input and is susceptible to falsely turning off the prompt.

In U.S. Pat. No. 5,956,675 issued to A. Setlur and R. Sukkar an ASR method was described for smart barge-in detection in the context of connected word recognition. That patent described a method and apparatus for detecting barge-in using a system that used the beam search framework. Barge-In was declared as soon as all viable speech recognition paths in the decoding network had a word other than silence or garbage associated with them. It operated at the word level and shut off the prompt after the first content word (a contentless word is for example silence, coughing or clearing of throat) was detected. While this method described in U.S. Pat. No. 5,956,675 works well for connected digits and short words and is immune to inadvertent out-of-vocabulary speech, it may be impractical for longer duration words since it would take much longer for the prompt to be turned off.

Hence there is a need for "smart" barge-in detection for more general tasks wherein the ASR system detects the onset of valid speech input before disabling the audio prompt, yet "smart" enough to ignore contentless sound energy.

SUMMARY OF THE INVENTION

Briefly stated, the aforementioned problems are overcome and a technological advance is made by providing the problem of early determination of onset of valid spoken input by examining sub-word units in a decoding tree. The present invention lends itself well to a wider range of speech recognition tasks since it operates at the sub-word level and does not suffer from the drawback mentioned above of not working effectively on longer duration words. Additionally, the present invention is more efficient in CPU utilization compared with previous systems, since it examines only the best scoring path instead of all viable paths of the decoding network.

In accordance with one embodiment of the invention, the aforementioned problem is solved by providing an ASR method which has the steps of: a. determining if a speech utterance has started, if an utterance has not started then obtaining next frame and re-running step a, otherwise continuing to step b; b. obtaining a speech frame of the speech utterance that represents a frame period that is next in time; c. extracting features from the speech frame; d. computing likelihood scores for all active sub-word models for the present frame of speech; e. performing dynamic programming to build a speech recognition network of likely sub-word paths; f. performing a beam search using the speech recognition network; g. updating a decoding tree of the speech utterance after the beam search; h. finding the best scoring sub-word path of said likely sub-word paths and determining a number of sub-words in said best scoring sub-word path; i. determining if said best scoring sub-word path has a sub-word length greater than a minimum number of sub-words and if the best scoring path is greater proceeding to step j, otherwise returning to step b; j. determining if recorded root is a sub-string of best path and if recorded root is not a sub-string of best path recording best path as recorded root and returning to step b, otherwise proceeding to step k; k. determining if the recorded root has remained stable for a threshold number of additional sub-words and if said root of said best scoring path has not remained stable for the threshold number returning to step b otherwise proceeding to step 1; l. declaring barge-in; m. disabling any prompt that is playing; and n. backtracking through the best scoring path to obtain a string having a greatest likelihood of corresponding to the utterance; and outputting the string. This embodiment can further have in parallel with step i, a second branch of steps including the steps of: determining if a number of sub-words in said best path exceeds a maximum number of sub-words, and if said maximum number has been exceeded proceeding to step 1 and if said maximum number has not been exceeded returning to step b. Alternatively this embodiment can further have in parallel with step i, a third branch of steps including the step of determining if a speech endpoint has been reached, if yes said speech endpoint has been reached then begin backtracking to obtain recognized string and declaring barge-in and proceeding to step m, and if no said speech endpoint has not been reached then proceeding to step b. Yet a further embodiment can have both second and third branches of steps in parallel with step i.

In another embodiment of the invention, the aforementioned problem is overcome by providing an automatic speech recognition system supporting barge-in that operates on the sub-word level.

BRIEF DESCRIPTION OF THE DRAWING

FIGS. 2A and 2B when joined together provide a flow diagram of a method of ASR according to the present invention.

DETAILED DESCRIPTION

Figure 1:
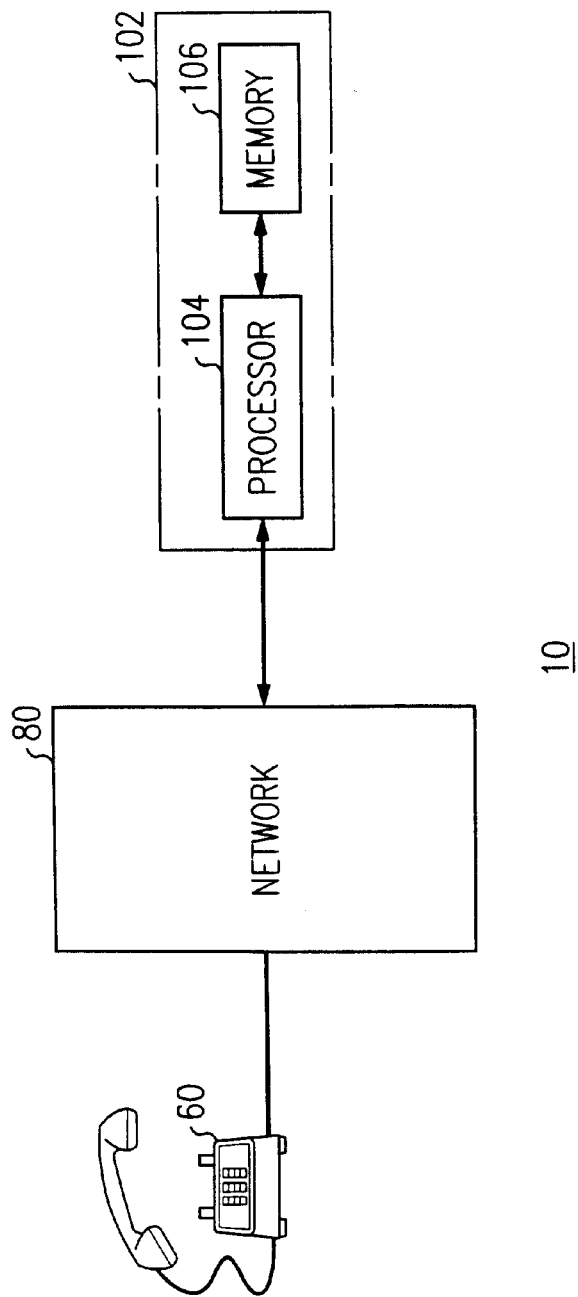
FIG. 1 is a block diagram of a sub-word system.

The present invention solves the problem of early determination of onset of valid spoken input much the same way that was done in U.S. Pat. No. 5,956,675, which is hereby incorporated by reference. One difference between the present invention and U.S. Pat. No. 5,956,675 being that the present invention examines sub-word units instead of whole-word units in the decoding tree. Referring to FIG. 1, an arrangement 10 for automatic speech recognition using sub-word units is shown. The arrangement 10 includes a voice input/audio output device 60, represented as a telephone handset, although other microphone-speaker combinations could also be used as the device 60. The device 60 is connected to a network 80, which can be any type of network, for example a circuit network or a packet network, that carries audio information to and from device 60. The network 80 is connected also to an automatic speech recognition (ASR) system 102 that examines sub-words. ASR system 102 includes a processor 104 and a memory 106. Processor 104 is for executing instructions and controlling data input and output. Memory 106, which typically contains read-only memory, random access memory and mass storage (not shown), contains the instructions and the ASR models for speech recognition.

The sub-word unit system 102, along with the sub-word unit method it uses, has the advantage of not suffering from the drawbacks mentioned above, such as not working effectively on longer duration words. Additionally, the present invention is more efficient in processor utilization compared with U.S. Pat. No. 5,956,675, since only the best scoring path is examined instead of all viable paths of the decoding network as in U.S. Pat. No. 5,956,675.

ASR system 102 models acoustic speech events using continuous density hidden Markov models. Words are modeled as a sequence of phonemes. These phonemes are also interchangeably referred to as sub-words. For each word there is a corresponding phoneme sequence representation. There are only a finite number of phonemes for each language and they are typically less than 100. A pre-specified grammar, which is based upon the language in use, dictates which sequences of words are considered valid. This pre-specified grammar is subsequently translated into a phoneme network by decomposing each word into its corresponding phoneme sequence, i.e. sub-word, representation.

The recognition task involves searching for the most likely ("highest likelihood score") sequence of words under the constraints of the grammar that best matches the input speech. This is equivalent to searching for the best corresponding phoneme sequence under the constraints of this pre-specified phoneme network. The grammar, by default, includes optional silence at the beginnings and ends of all words, and also allows for leading filler or garbage models that model out-of-vocabulary speech. A full search of all valid phoneme sequences to find the best match is too large to be practical. A beam search algorithm has therefore been adopted. The beam search algorithm only searches the active portion of the phone network, which significantly reduces the search complexity and lends itself well to practical implementations. At the beginning of a spoken utterance, the beam search algorithm begins by activating all valid start phonemes as prescribed by the recognition grammar. At each time frame t, dynamic programming using a Viterbi algorithm is performed over the then active portion of the phoneme network. The active portion of the phoneme network is a time varying entity. Unlikely phoneme sequences that have a cumulative likelihood score lower than a pre-scribed value (also referred to as the prune level) relative to the current best cumulative score are 'pruned' (removed) and the remaining phoneme sequences are retained and extended as specified in the grammar. This process is repeated for each time frame t (which in our instance is 10 ms of speech data) on the active portion of the phone network. At each time frame t, the list of "viable" phoneme sequences is updated and stored as a linked list also known as the decoding tree. Each node in the decoding tree corresponds with a particular active phoneme of the phone network as prescribed by the grammar. At the end of the spoken utterance, the best scoring ending phoneme is used to retrieve the most likely phoneme sequence by traversing through the list of corresponding pointer entries in the decoding tree and this process is commonly referred to as backtracking. The phoneme sequence picked by "backtracking" at the end is referred to as the global best path and all intermediate winners are referred to as local best paths.

According to one embodiment of the present invention there is provided a method 200 to declare the onset of barge-in using information that is available in the ASR system 102. The first step is to continually monitor the current best scoring phoneme sequence, also referred to as the local best path, throughout evolution of that path while recognition is active. From the description of the system operation in the previous section, it is clear that the best scoring local path is a time varying entity. This means a local best path at a particular time instant may not be the global best path or even a sub-string of it when recognition is complete. This concept is best illustrated by means of example 1.

Consider a task where the ASR system 102 has to pick the company name that best matches the spoken input from a list of 7000 or so possible company names. Here each company name is treated as a single word and each of them have a phoneme representation. Let us follow the evolution of the best path of a spoken company name NewConceptsEngineering, whose phoneme representation is nukansEptsEnJxnirIG. Listed below is the frame number and the corresponding local best path each time there is a change in the local best path which is based on the cumulative likelihood score of the phoneme sequence up to that time instant.

Frame 6 LocalBestPathPhonemeSequence: n
Frame 8 LocalBestPathPhonemeSequence: ni
Frame 9 LocalBestPathPhonemeSequence: nI
Frame 12 LocalBestPathPhonemeSequence: nu
Frame 38 LocalBestPathPhonemeSequence: nul
Frame 40 LocalBestPathPhonemeSequence: nuo
Frame 44 LocalBestPathPhonemeSequence: nuol
Frame 47 LocalBestPathPhonemeSequence: nuold
Frame 101 LocalBestPathPhonemeSequence: nuoldt
Frame 104 LocalBestPathPhonemeSequence: nuk
Frame 109 LocalBestPathPhonemeSequence: nuka
Frame 122 LocalBestPathPhonemeSequence: nukan
Frame 129 LocalBestPathPhonemeSequence: nukans
Frame 140 LocalBestPathPhonemeSequence: nukansE
Frame 150 LocalBestPathPhonemeSequence: nukansEp
Frame 157 LocalBestPathPhonemeSequence: nukansepts
Frame 174 LocalBestPathPhonemeSequence: nukansEptsE
Frame 182 LocalBestPathPhonemeSequence: nukansEpt-sEn
Frame 188 LocalBestPathPhonemeSequence: nukansEpt-sEnJ
Frame 195 LocalBestPathPhonemeSequence: nukansEpt-sEnJx
Frame 199 LocalBestPathPhonemeSequence: nukansEpt-sEnJxn
Frame 203 LocalBestPathPhonemeSequence: nukansEpt-sEnJxni
Frame 217 LocalBestPathPhonemeSequence: nukansEpt-sEnJxnir Frame 228 LocalBestPathPhonemeSequence: nukansEpt-sEnJxnirI Frame 233 LocalBestPathPhonemeSequence: nukansEpt-sEnJxnirIG

EXAMPLE 1

Notice that until frame 104, the best phoneme sequence points to a company name different from NewConceptsEngineering. From frame 104 forward, the local best path is a growing substring of the phoneme representation of NewConceptsEngineering. The above example had a total of 241 frames of speech. So instead of waiting the full 241 frames to declare that a word was spoken, the present invention provides a reliable way of declaring barge-in sooner.

Figure 2B:
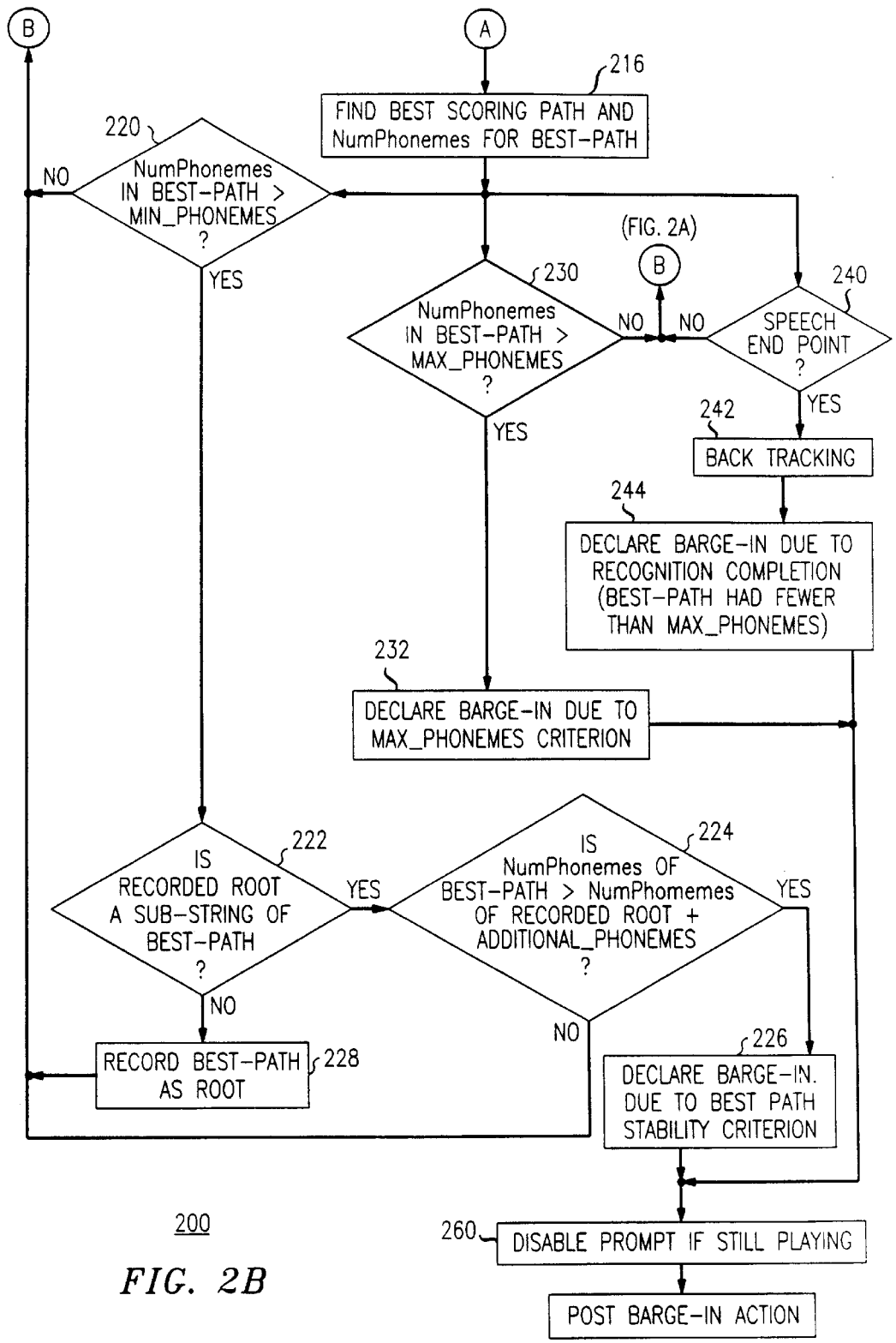

In the present invention, the information regarding the local best path that is available within the ASR system 102 and is used by method 200 (shown in FIGS. 2A and 2B) to declare the onset of barge-in in a more reliable manner compared to U.S. Pat. No. 5,956,675. Method 200, as will be described, includes three strategies, one based on best path phoneme stability for declaring barge-in, another based on absolute phoneme count of content phonemes in the best path for declaring barge-in and a third based on detection of a speech endpoint to declare barge-in. These three strategies are used in parallel in the present ASR system 102. Other embodiments of ASRs could use two of the three strategies, or even just one of the strategies.

Method 200 starts with step 202 in which a determination is made if energy of sufficient level to possibly be considered speech has been received in a frame of predetermined time. If at step 202, the determination is no, the method 200 proceeds to step 203 and step 202 is repeated for the next frame. Note step 202 requires a time framing process (not shown for brevity) to continuously frame the signals received from the network 80. Often these frames will be empty or have only noise signals. In such cases, the energy level is low and so step 202 will not consider an empty or low energy level frame as speech to be recognized. If there is a greater amount of noise or someone making sounds or some kind of utterance, such as coughing, breathing or talking, step 202 will determine that enough speech energy is present to start speech recognition processes and the speech recognition process begins. Next, step 204 sequentially loads the latest time frame. (if this is just the beginning this is the first frame). After the first frame, step 204 will sequentially load all the time frames until speech processing of the present utterance is completed. After loading in step 204, each frame has its features extracted and stored at step 206. This feature extraction is typical feature extraction. In step 208 the features extracted in step 206 are compared to models, such as hidden Markov models, of phonemes or sub-words according to a predetermined grammar. As the extracted features are compared to the word models that are active, likelihood scores are compiled in step 208. Some sounds are not sub-words, such as breath sounds, coughs and so forth. These sounds have models also, but when a sound is matched up to such a model, it is considered a contentless (i.e. non speech) sound. Next, Step 210 takes the active node model scores and performs dynamic programming to build sub-word networks of possible sub-word sequences that the utterance being recognized could possibly be. This dynamic programming uses a Viterbi algorithm in its operation. Once the dynamic programming for the present frame is completed, a beam search is performed at step 212. In this beam search step unlikely sub-word sequences are pruned away, likely sub-word sequences are extended and an updated active sub-word list is stored in memory. Next, step 214 updates a decoding tree built to provide at the end of the utterance the most likely sub-word sequence corresponding to the utterance. Next, step 216 finds the best scoring path for the most likely sub-word sequence and determines the number of phonemes or sub-words in the best scoring path.

After step 216, the method 200 operates with three parallel branches. A first branch goes to step 220, a second branch goes to step 230 and a third branch goes to step 240. All three branches are active and use different criteria to declare barge-in.

Step 220 of the first branch of method 200 determines if a number of phonemes or sub-words in the present best path has exceeded a threshold MIN_PHONEMES. If at step 220 it is determined that the threshold MIN_PHONEMES for the minimum number of phonemes or sub-words has not been exceeded, then the method 200 goes to step 204 to process a new frame, and repeat steps 204–216. If at step 220, however, it is determined that the threshold MIN_PHONEMES for the minimum number of phonemes or sub-words has been exceeded, then method 200 proceeds to step 222. At step 222 if the previous best path is not a sub-string of the current best path, then the method proceeds to step 228 and the current best path is recorded as the root of the best scoring path. After step 228, the method proceeds to step 204. If the root is not updated, such as when the current best path is just an extension of the previously recorded root, the method proceeds to step 224. At 224 a determination is made if the root of the best scoring path has not changed (if it is stable) and if the current best path is ADDITIONAL_PHONEMES longer than the recorded root. If the best scoring path is not stable for the number of ADDITIONAL_PHONEMES, i.e. the recorded root is no longer a sub-string of the previous best path, method 200 goes to step 204. If the best scoring path root is stable for the number of ADDITIONAL_PHONEMES, method 200 goes to step 226. At step 226, since the best scoring path root has at least the threshold number, MIN_PHONEMES, of phonemes or sub-words to establish a speech utterance and since the best scoring path root has remained stable (i.e. not changed) for a second threshold number, ADDITIONAL_PHONEMES, a barge-in is declared. Next, method 200 proceeds to step 260 and any audio prompt that is playing is disabled. At this point a sub-word sequence within the grammar of the ASR system has been recognized that has more than the minimum numbers of sub-words and that has been the stable recognized sub-word sequence for the required number of additional sub-words. These conditions indicate recognition of the sub-word sequence is likely enough to justify declaring barge-in (step 226) and stopping any prompt (step 260) being played by the ASR system 102.

Method 200 also has the second branch out of step 216, and this second branch leads to step 230. At step 220, a decision is made if the number of phonemes in the best path is greater in number than a threshold number, MAX_PHONEMES. If the number of phonemes in the best path does not exceed MAX_PHONEMES, then there is not sufficient evidence to declare barge-in. In this case, the method 200 returns to step 204 to get at least one additional phoneme. If, at step 230, the number of phonemes in the current best path exceeds MAX_PHONEMES, then enough evidence has been collected to establish a sufficient likelihood that the current best sub-word path is the final recognition path. At this point then the decision is made to proceed to step 232 and declare barge-in and proceed to step 260 and stop any prompt that is playing. This second branch can independently declare barge-in without the additional phonemes stability check and turn off the prompt to a user talking over the prompt. To allow the first branch of steps 220, 222 and 224 to have an impact, MAX_PHONEMES is set to a number that is greater than the sum of MIN_PHONEMES and ADDITIONAL_PHONEMES.

The third branch of method 200 from 216 proceeds to step 240. Step 240 determines if a speech endpoint has occurred. In cases when there are fewer than MAX_PHONEMES phonemes in the word or company name spoken such that a speech endpoint is reached, it is considered sufficient to report barge-in after recognition is complete. If a speech endpoint has not been reached, the method proceeds to step 204. If a speech endpoint has been reached by the ASR, the method proceeds to step 242. At step 242, backtracking to establish the best path when the speech endpoint was reached takes place. Next, at step 244, barge-in due to speech recognition completion is declared. The result will be the best path that had fewer than MAX_PHONEMES. After barge-in is declared, method 200 proceeds to step 260 where any prompt that is playing is stopped. In the case of this third branch, the backtracking is finished before the prompt is stopped.

This improved sub-word barge-in means the prompt, which is stopped for a barge-in, can be stopped for good reason sometimes before the first word is completely uttered.

The method 200 is straightforward in that it counts up the number of content phonemes in the local best path each time there is a change in the local best path. Phonemes representing silence and fillers are excluded from the set since they are considered contentless. As soon as the number of content phonemes reaches a prespecified limit, MAX_PHONEMES, barge-in is declared in the second branch of method 200 by step 232. This approach works remarkably well and guards against stoppage of the prompt due to inadvertent speech input such as cough, breath etc. since they will be modeled as contentless phonemes and will not figure into the content phoneme count that is used for determining barge-in. In one embodiment of the present system the phoneme count, MAX_PHONEMES, is set to be 12, which is a conservative setting. A smaller setting of this count would be more aggressive and cause barge-in to be declared sooner. In example 1 mentioned above with MAX_PHONEMES set to 12, barge-in would have been declared at frame 182 instead of frame 241 which represents the end of the complex word: NewConceptsEngineering.

Referring again to FIG. 2A and 2B, the first branch of method 200, which is more stringent compared to the second branch of method 200, is shown. While the second branch of method 200 only insists that some local best path reach MAX_PHONEMES number of phonemes before a barge-in is declared, the first branch of method 200 insists on best local path stability before declaring a barge-in. The "stability" criterion is that the local best path have a minimum of MIN_PHONEMES phonemes and an additional ADDITIONAL_PHONEMES number of phonemes where the root remains unchanged.

In a preferred embodiment of system 102 and method 200, MIN_PHONEMES of 6 and ADDITIONAL_PHONEMES of 4 are used, but these are adjustable and depend on how aggressive barge-in needs to be. To illustrate, consider example 2:
The spoken company name to be recognized is Sequoia-GrovePotters
Frame 62 LocalBestPathPhonemeSequence: s
Frame 73 LocalBestPathPhonemeSequence: st
Frame 81 LocalBestPathPhonemeSequence: stu
Frame 82 LocalBestPathPhonemeSequence: st^
Frame 84 LocalBestPathPhonemeSequence: sx
Frame 86 LocalBestPathPhonemeSequence: sx
Frame 88 LocalBestPathPhonemeSequence: st^f
Frame 90 LocalBestPathPhonemeSequence: sxv
Frame 91 LocalBestPathPhonemeSequence: st^k
Frame 101 LocalBestPathPhonemeSequence: st^ko
Frame 107 LocalBestPathPhonemeSequence: Dxkl
Frame 110 LocalBestPathPhonemeSequence: sIkY
Frame 113 LocalBestPathPhonemeSequence: Dxkli
Frame 126 LocalBestPathPhonemeSequence: Dxklin
Frame 136 LocalBestPathPhonemeSequence: Dxklint
Frame 138 LocalBestPathPhonemeSequence: Dxklin
Frame 141 LocalBestPathPhonemeSequence: Dxklint
Frame 146 LocalBestPathPhonemeSequence: vIktcrixzgar
Frame 149 LocalBestPathPhonemeSequence: C^kw@gx
Frame 159 LocalBestPathPhonemeSequence: sIkwOxgro
Frame 173 LocalBestPathPhonemeSequence: sIkwOxgrov
Frame 179 LocalBestPathPhonemeSequence: sIkwOxgrovp
Frame 189 LocalBestPathPhonemeSequence: sIkwOxgrovpa
Frame 195 LocalBestPathPhonemeSequence: sIkwOxgrovpat
Frame 203 LocalBestPathPhonemeSequence: sIkwOxgrovpatR
Frame 210 LocalBestPathPhonemeSequence: sIkwOxgrovpatRz

EXAMPLE 2

The second branch of method 200 would have declared barge-in after the prespecified count of MAX_PHONEMES was met which was at frame 146. The first branch of method 200 would instead wait until frame 195 before declaring barge-in since that is the first time the stability criteria of having a stable root for ADDITIONAL_PHONEMES number of phonemes is at frame 195 with the root being defined at frame 159. Notice in this example that there is a lot of churn in the LocalBestPath until "stability" is achieved between frames 159 and 195. It turns out that the longer it takes for the best path to stabilize, the less confident one can be about the recognized company name. In practice, when there are an adequate number of phonemes, there is a high correlation between best path instability and misrecognitions. So the stability criteria can be used as a goodness of recognition quality measure in addition to being used as a barge-in detector.

In general, the second branch of method 200 is a more stringent test and takes longer to be met for most spoken inputs. In some cases, the stability criterion may take too long or never be met and may be hard to use as a barge-in detector since the system prompt needs to be shut off in a timely fashion. In that sense the second branch of method 200 is much more predictable and serves as a default or relief mechanism in case the more stringent criterion of the first branch is not met in time to turn off the prompt. The criterion for barge-in for the second branch will not be satisfied if the spoken input contains fewer than MAX_PHONEMES phonemes. For phoneme sequences that are fewer than MAX_PHONEMES long, barge-in is declared only after recognition completion which is acceptable since the spoken input is short to begin with. The third branch serves as a relief mechanism in cases where there are inadequate number of phonemes for the first and second branches. That is why a preferred embodiment of the present invention includes all three branches of method 200 to cover all the scenarios described above. It is believed that this sub-word recognition-based barge-in detection system is-superior to known techniques, among other reasons because it is more robust to inadvertent speech not included in the grammar.

Thus, it will now be understood that there has been disclosed a faster barge-in method and apparatus through the use of sub-words and examination of the best path. This method and apparatus can provide more reliable barge-in operation for voice response systems. While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed is:

1. A method comprising the steps of:
   a. determining if a speech utterance has started, if an utterance has not started then obtaining next frame and re-running step a, otherwise continuing to step b;
   b. obtaining a speech frame of the speech utterance that represents a frame period that is next in time;
   c. extracting features from the speech frame;
   d. computing likelihood scores for all active sub-word models for the present frame of speech;
   e. performing dynamic programming to build a speech recognition network of likely sub-word paths;
   f. performing a beam search using the speech recognition network;
   g. updating a decoding tree of the speech utterance after the beam search;
   h. finding the best scoring sub-word path of said likely sub-word paths and determining a number of sub-words in said best scoring sub-word path;
   i. determining if said best scoring sub-word path has a sub-word length greater than a minimum number of sub-words and if the best scoring path is greater proceeding to step j, otherwise returning to step b;
   j. determining if recorded root is a sub-string of best path and if recorded root is not a sub-string of best path recording best path as recorded root and returning to step b, otherwise proceeding to step k;
   k. determining if the recorded root has remained stable for a threshold number of additional sub-words and if said root of said best scoring path has not remained stable for the threshold number returning to step b otherwise proceeding to step l;
   l. declaring barge-in;
   m. disabling any prompt that is playing; and
   n. backtracking through the best scoring path to obtain a string having a greatest likelihood of corresponding to the utterance; and outputting the string.

2. The method of claim 1, wherein said sub-word sequence recognized must be a sub-word sequence found in a pre-specified grammar.

3. The method of claim 1, further comprising the step of:
   in parallel with step i, determining if a number of sub-words in said best path exceeds a maximum number of sub-words, and if said maximum number has been exceeded proceeding to step l and if said maximum number has not been exceeded returning to step b.

4. The method of claim 3, further comprising the step of:
   in parallel with step i, determining if a speech endpoint has been reached, if yes said speech endpoint has been reached then begin backtracking to obtain recognized string and declaring barge-in and proceeding to step m, and if no said speech endpoint has not been reached then proceeding to step b.

5. The method of claim 1, further comprising the step of:
   in parallel with step i, determining if a speech endpoint has been reached, if yes said speech endpoint has been reached then begin backtracking to obtain recognized string and declaring barge-in and proceeding to step m, and if no said speech endpoint has not been reached then proceeding to step b.

6. A method for speech recognition using barge-in comprising the steps of:
   a. determining if a speech utterance has started, if an utterance has not started then returning to the beginning of step a, otherwise continuing to step b;
   b. getting a speech frame that represents a frame period that is next in time;
   c. extracting features from the speech frame;
   d. using the features extracted from the present speech frame to score sub-word models of a speech recognition grammar;
   e. dynamically programming an active network of sub-word sequences using a Viterbi algorithm;
   f. pruning unlikely sub-word sequences and extending likely sub-word sequences to update the active network;
   g. updating a decoding tree to said likely sub-word sequences;
   h. finding the best scoring sub-word path of said likely sub-word paths and determining a number of sub-words in said best scoring sub-word path;
   i. determining if said best scoring sub-word path has a sub-word length greater than a minimum number of sub-words and if the best scoring path is greater proceeding to step j, otherwise returning to step b;
   j. determining if recorded root is a sub-string of best path and if recorded root is not a sub-string of best path recording best path as recorded root and returning to step b, otherwise proceeding to step k;
   k. determining if the recorded root has remained stable for a threshold number of additional sub-words and if said root of said best scoring path has not remained stable for the threshold number returning to step b otherwise proceeding to step l;
   l. declaring barge-in;
   m. disabling any prompt that is playing; and
   n. outputting the string corresponding to said best scoring path.

7. The method of claim 6, wherein said sub-word sequence recognized must be a sub-word sequence found in a pre-specified grammar.

8. The method of claim 6, further comprising the step of:
   in parallel with step i, determining if a number of sub-words in said best path exceeds a maximum number of sub-words, and if said maximum number has been exceeded proceeding to step l and if said maximum number has not been exceeded returning to step b.

9. The method of claim 8, wherein step h further comprises:
   examining all viable sub-word sequences contained in the decoding tree for the present speech frame;
   traversing through pointers that are associated with sub-word sequences of the decoding tree; and counting a number of sub-words in the best scoring sub-word sequence path.

10. The method of claim 9, wherein only pointers that are associated with sub-word sequences of the decoding tree that have speech content are traversed.

11. The method of claim 6, wherein step h further comprises:

examining all viable sub-word sequences contained in the decoding tree for the present speech frame;

traversing through pointers that are associated with sub-word sequences of the decoding tree; and counting a number of sub-words in the best scoring sub-word sequence path.

12. The method of claim 11, wherein only pointers that are associated with sub-word sequences of the decoding tree that have speech content are traversed.

13. An apparatus for automatic speech recognition of a speech utterance to declare barge-in comprising:

means for determining if the speech utterance has started;

means responsive to said speech utterance start determining means for obtaining a speech frame of the speech utterance that represents a frame period that is next in time;

means for extracting features from said speech frame;

means for performing dynamic programming to build a speech recognition network of likely sub-word paths;

means for performing a beam search using the speech recognition network;

means for updating a decoding tree of the speech utterance after the beam search;

means for finding the best scoring sub-word path of said likely sub-word paths and determining a number of sub-words in said best scoring sub-word path; and means for determining if said best scoring sub-word path has a sub-word length greater than a minimum number of sub-words;

means responsive to a condition that the best scoring path is greater recording a root of a sub-word sequence corresponding to said best scoring path for determining if a count of times the recorded root has remained stable for a threshold number of additional sub-words;

means responsive to a condition of the root of said best scoring path has remained stable during at least the threshold number of additional phonemes and declaring barge-in and disabling any prompt that is playing when the recorded count exceeds the threshold number.

14. The apparatus for automatic speech recognition of claim 13, further comprising:

means for backtracking through the best scoring path to obtain a string having a greatest likelihood of corresponding to the utterance; and outputting the string.

15. The apparatus of claim 14, wherein all said means comprise a system having a processor running a program stored in connected memory.

16. The apparatus of claim 13, wherein all said means comprise a system having a processor running a program stored in connected memory.

* * * * *